INVENTORS
CLAUDE H. CHILD
ROBERT E. HOVDA
BY Rolf M. Pitts
ATTORNEY

MICROWAVE DELAY SYSTEM

Filed June 18, 1962 2 Sheets-Sheet 2

INVENTORS
CLAUDE H. CHILD
ROBERT E. HOVDA
BY Rolf M. Pitts
ATTORNEY 3,185,985
Patented May 25, 1965

3,185,985

MICROWAVE DELAY SYSTEM

Claude H. Child, Paramount, and Robert E. Hovda, Yorba Linda, Calif., assignors to North American Aviation, Inc.

Filed June 18, 1962, Ser. No. 203,132
10 Claims. (Cl. 343—17.7)

This invention relates to a microwave delay system, and more particularly to means for delaying a microwave signal through the use of low frequency delay means.

Frequently, in the processing of microwave signals (e.g., signals in the frequency range of 8.6 to 9.6 kilo-megacycles per second and at higher frequencies), it is necessary to effect a time delay. Such time delay of microwave signals is useful for the self-testing of pulsed microwave systems. In airborne monopulse radar systems, for example, the system response to a calibrated time delay may be observed and utilized as a means of evaluating and calibrating the system. However, such utilization requires relay line means which are much more accurately calibrated than the system to be thus tested.

The accomplishment of relatively long time delays (on the order of several microseconds) of signals at microwave frequencies has heretofore required expensive and cumbersome delay lines. The use of such cumbersome delay lines in airborne applications is undesirable for the reason that the space and weight are at a premium in airborne vehicles, and are sought to be reduced to minimums. Such microwave delay lines are not only expensive and cumbersome, but are also difficult to adjust and calibrate, being subject to fluctuation with temperature, humidity and frequency. Therefore, it is difficult to provide a stable calibrated time delay by such means.

However, time delays of several microseconds are conveniently achieved at radio frequencies (e.g., frequencies of, or below, a few megacycles per second) by means of a suitable delay means, such as a conventional ultrasonic delay line. Also, such radio frequency delay lines are extremely stable and not subject to extreme fluctuations.

Accordingly, it is a general object of this invention to provide improved means employing ultrasonic delay means for the time delay of microwave signals.

In a preferred embodiment of the concept of the invention, there is provided a generator for generating a subharmonic of a microwave signal. A radio frequency time delay device is connected to receive the output of the subharmonic generator, and a harmonic generator is connected to receive the output of the radio frequency delay means.

By means of the above described arrangement, the microwave signal is converted to radio frequency signal, the radio frequency signal is delayed by radio frequency delay means, and then the delayed radio frequency signal is converted back to a microwave signal having the original microwave frequency and the desired delay. In this way, there is provided a time delayed microwave signal without resort to the use of microwave delay lines.

Accordingly, it is an object of this invention to provide improved means for the time delay of a microwave signal.

It is another object of the invention to provide improved means for a stable time delay of the microwave signal.

It is still another object of the subject invention to provide radio frequency time delay means for effecting the time relay of a microwave signal.

It is a further object of the invention to provide frequency conversion means including a harmonic generator and a subharmonic generator cooperating with radio frequency time delay means for effecting a stable delay of microwave signals.

It is still a further object of the subject invention to provide means exclusive of microwave delay lines for effecting the time delay of a microwave signal.

It is yet another object of the subject invention to provide relatively inexpensive and simple means for effecting a stable time delay of a microwave signal.

It is yet a further object of the subject invention to provide improved means for calibrating and testing of airborne pulse radar systems.

These and other objects of the invention are apparent from the following description, taken together with the accompanying drawings in which.

Figure 1:
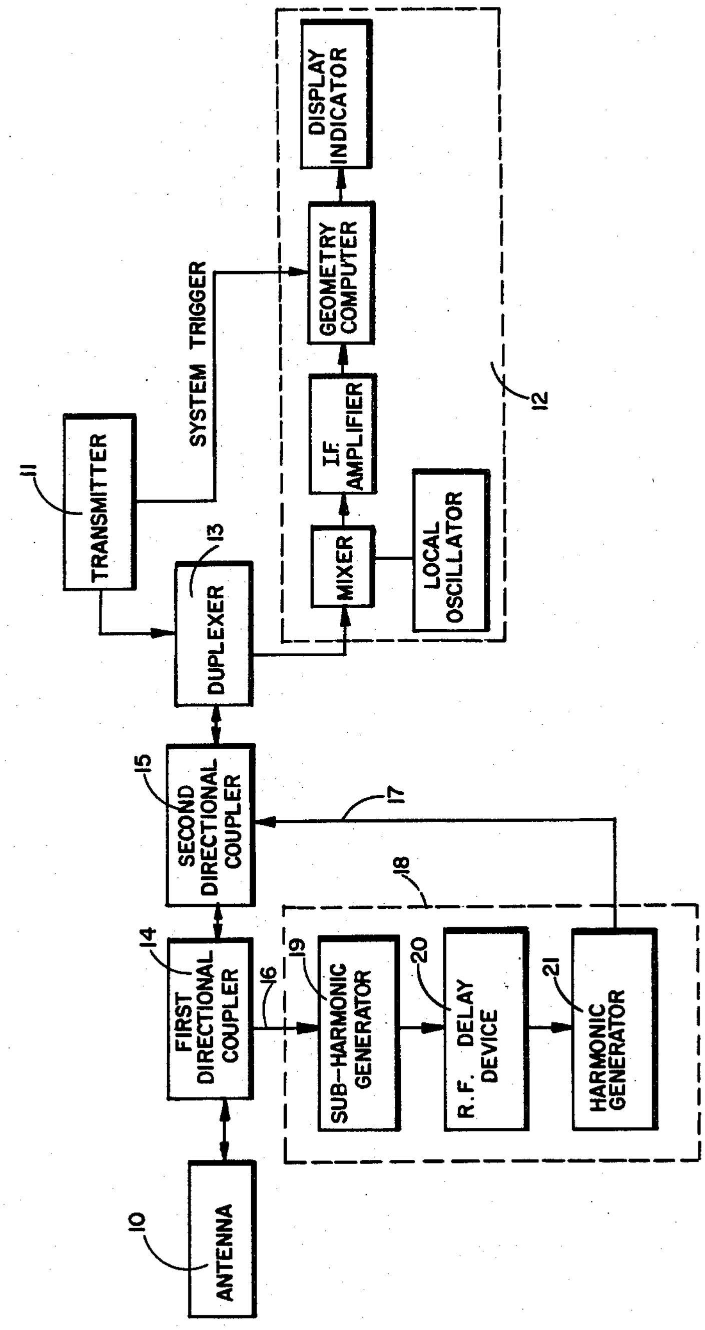
FIG. 1 is a block diagram of a pulsed radar system employing a concept of the invention.

Referring to FIG. 1, there is illustrated a radar system, such as is adapted to airborne applications, incorporating the device of the invention for test purposes. There is provided a directional antenna 10 operatively coupled to receive microwave energy from a microwave transmitter 11. A microwave receiver 12 receives echoes of such microwave energy by means of a duplexer 13 or other means from antenna 10. The purpose of duplexer 13 is to allow the transmitter to send energy to the antenna to be transmitted without saturating or damaging the receiver 12, while connecting the receiver 12 to antenna 10 for receiving and detecting echo energy returned to the antenna. Such function and use of the duplexer, as well as its structure, is well known in the art, as is shown, for example, in U.S. Patent No. 2,995,746 issued August 8, 1961, to R. S. Sherry et al. for Radar System With Altitude Ambiguity Resolver.

Interposed between antenna 10 and duplexer 13 are a first and second microwave directional coupler 14 and 15. First directional coupler 14 is adapted to provide an output, on line 16, of energy transmitted from transmitter 11 (through duplexer 13) to antenna 10, but does not provide an output on line 16 of echo energy received from antenna 10 which are sent to receiver 12 (via duplexer 13). Similarly, second directional coupler 15 is adapted to transmit a microwave input signal applied to input line 17 to receiver 12 (via duplexer 13), but does not transmit such signal to antenna 10.

First directional coupler 14 acts to feed off to delay generator 18, a portion of the outgoing energy. Second directional coupler 15 acts to feed to the duplexer, energy received from the delay generator 18. Such couplers may be constructed in any suitable manner known to those skilled in the art or as is described, for example, in Chapter 14, volume II, "Techniques of Microwave Measurements," of the M.I.T. Radiation Laboratory Series, published by McGraw-Hill (1947).

There is further provided a delay generator 18 for providing a predetermined time delay to the microwave signal. In other words, the microwave output signal of delay generator 18 is the same frequency (and attenuated amplitude) as the microwave input signal, but has a time delay relative to the microwave input signal. The input of the signal delay generator 18 is connected to the output line 16 of first directional coupler 14, and the output thereof is operatively connected to line 17 of second directional coupler 15.

Delay generator 18 is comprised of a subharmonic generator means 19, a delay device 20, and a harmonic generator. Subharmonic generator means 19 is connected to line 16 for receiving a portion of the microwave energy passing through couple 14 to antenna 10. Subharmonic generator means 19, of course, provides a subharmonic output having a frequency considerably below the microwave frequency fed to it. Delay device 20 is responsively coupled to subharmonic generator means 19 for effecting a time delay in the output from subharmonic generator 19. There is also provided a harmonic generator 21 responsively connected to the output of delay device 20 for restoring the delayed output thereof to the original microwave frequency of the energy received on line 16.

The structure of delay generator 18 is described more fully hereinafter, in connection with FIG. 2 of the drawings.

The delayed output of harmonic generator 21 is fed back to duplexer 13 by means of second coupler 15. Duplexer 13, in turn, feeds the delayed energy pulse to receiver 12. Hence, it is to be appreciated that the cooperation of couplers 14 and 15 and microwave signal delay generator 18 with the pulsed radar system of FIG. 1 serve to provide a simulated target signal, simulating a target at a range corresponding to the time delay provided through the use of time delay generator 18.

A time delay generator 18 utilized to provide a signal to duplexer 13, having a predetermined time delay, is thus used to evaluate and calibrate the radar. Because the time delay generator is adapted to be operated in conjunction with the entire pulsed radar system of FIG. 1, including transmitter 11, the evaluation, testing and calibration of the radar system may be conducted during operational missions of an airborne radar system. For example, if the display indicator of the receiver 12 provides the range circle or other references, but no target appears on the display indicator, a failure of equipment has occurred in the system. If, however, the target signal does regularly appear in the display indicator at a constant range corresponding to the predetermined time delay, regardless of the heading or changes of heading of the aircraft in which the system is installed, then such display signal indicates that the system is fully operable and is properly calibrated. If, however, the range indication of the simulated target is not coincident with that corresponding to the predetermined time delay of generator 18, then the display signal will indicate a different range, from which it can be deduced that the system is out of calibration.

Such range calibration of the pulsed radar system may be extremely critical depending on the specific use of the radar system, particularly in those applications where the accuracy of calibration of the radar range is critical.

The combination of elements 14, 15 and 18 in FIG. 1 provide an uncomplicated means for testing the response of an operational pulsed radar system, using a calibrated delay of a pulsed microwave signal.

Figure 2:
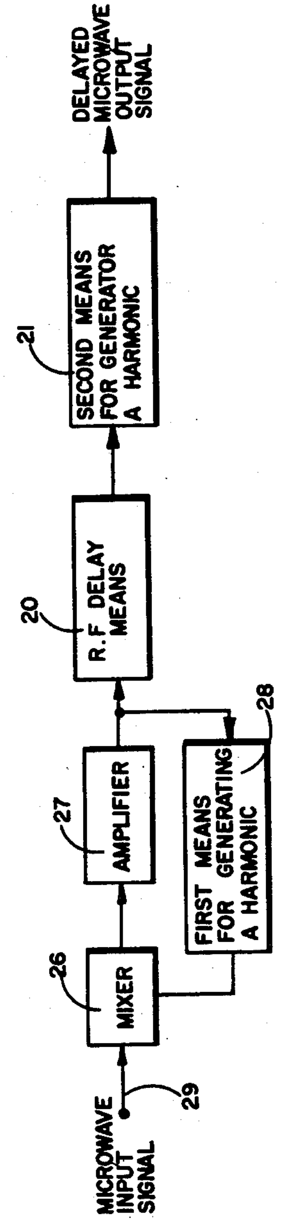
FIG. 2 is a block diagram of a preferred embodiment of the concept of the invention.

The means for providing such delay of a pulsed microwave signal is more particularly shown in FIG. 2.

Referring to FIG. 2, there is illustrated a block diagram of a preferred embodiment of the invention. There is provided a microwave frequency mixer 26 for providing a radio frequency output, a radio frequency amplifier 27, and a harmonic generator 28 for providing a microwave harmonic of the radio frequency input thereto. Microwave mixer 26 is adapted to be connected to a first source of a microwave signal and is connected to receive the output of first harmonic generator 28. The construction of microwave mixer 26 is well-known to those skilled in the art, as may be seen, for example, from the above mentioned U.S. Patent No. 2,995,746 issued to R. S. Sherry et al. Accordingly, such element is shown in block form only.

Radio frequency amplifier 27 is responsively connected to receive the radio frequency output of mixer 26. The input of first harmonic generator 28 is responsively connected to the output of amplifier 27. The construction and arrangement of radio frequency amplifier 27 is well known to those skilled in the art. Therefore, this element is shown in block form only. The gain of amplifier 27 in decibels within the radio frequency region of the low frequency components of the signal output of mixer 26 is preferably selected to be substantially equal to the combined microwave signal losses in decibels of the harmonic generator 28 and mixer 26, in order to support a regenerative effect of the described closed loop.

Harmonic generator 28 may be of any suitable type of waveguide section or other passive device for providing a microwave harmonic output of a radio frequency input. Such harmonic generators are available commercially, for example, from Microwave Associates, Inc., of Burlington, Mass., and can readily produce up to a tenth harmonic of an IF input with about a 30 decibel loss. Accordingly, element 28 is shown in block form only.

The radio frequency output of amplifier 27 is also fed to a radio frequency time delay element 20. Delay element 20 may be comprised of an ultrasonic delay device for providing a calibrated time delay of a radio frequency input signal, such as a double-ended ringing line of the type available commercially, for example, from Bliley Electric, Inc., of Erie, Pa., for providing accurately calibrated time delays at frequencies up to about 20 megacycles per second. Accordingly, time delay element 20 is shown in block form only.

A second harmonic generator 21 is connected to receive the output of radio frequency delay means 20, for providing a microwave signal output of the same frequency as the microwave signal input to mixer 26 (on line 29). Second harmonic generator 21 is similarly constructed and arranged as harmonic generator 28, but is selected to provide the next higher harmonic relative to that provided by first generator 28. For example, harmonic generator 28 provides the $(n)$ harmonic of the output of amplifier 27, second harmonic generator 21 is constructed to provide the $(n+1)$ harmonic. In normal operation of the above described arrangement, the mixer 26 provides component signals having frequencies equal to the sum and difference of the frequencies of the inputs to mixer 26. Because amplifier 27 has a selected bandwidth which includes only the lower or difference frequency signal components, the output of amplifier 27 provides a low frequency output having a frequency $f_o$. First harmonic generator 28, in response to such output, generates an $n$th harmonic of the $f_o$ frequency input to generator 28. Accordingly, the frequency of the output signal from generator 28 is $nf_o$. Hence, the relationship of the low frequency mixer output $f_o$ appearing at the output of amplifier 27 can be expressed in terms of the input frequency $f_i$, as follows:

$$f_i - nf_o f_o \qquad (1)$$

$$f_i = f_o(n+1) \qquad (2)$$

$$f_o = \frac{f_i}{n+1} \qquad (3)$$

Hence, it is to be appreciated that the harmonic generator feedback combination of elements 26, 27 and 28 provides a subharmonic output $(f_o)$ determined by the input frequency $(f_i)$ divided by the subharmonic order $(n)$ plus one.

The output of amplifier 27, fed to delay means 20, is delayed a precise amount which can be readily achieved by such delay element 20, to provide a pulsed output. Second harmonic generator 21 in response to the delayed IF frequency pulse, provides a $(n+1)$ harmonic of such input. In this way, a delayed pulse having a frequency $f_f$ equal to $(n+1)f_o$, is provided by second harmonic generator 21.

$$f_f = (n+1)f_o \qquad (4)$$

Substituting Equation 3 in Equation 4:

$$f_f=(n+1)\frac{f_i}{(n+1)}=f_i \qquad (5)$$

Thus it may be seen that the final frequency $f_f$ is equal to the input frequency, ($f_f=f_i$).

Figure 3:
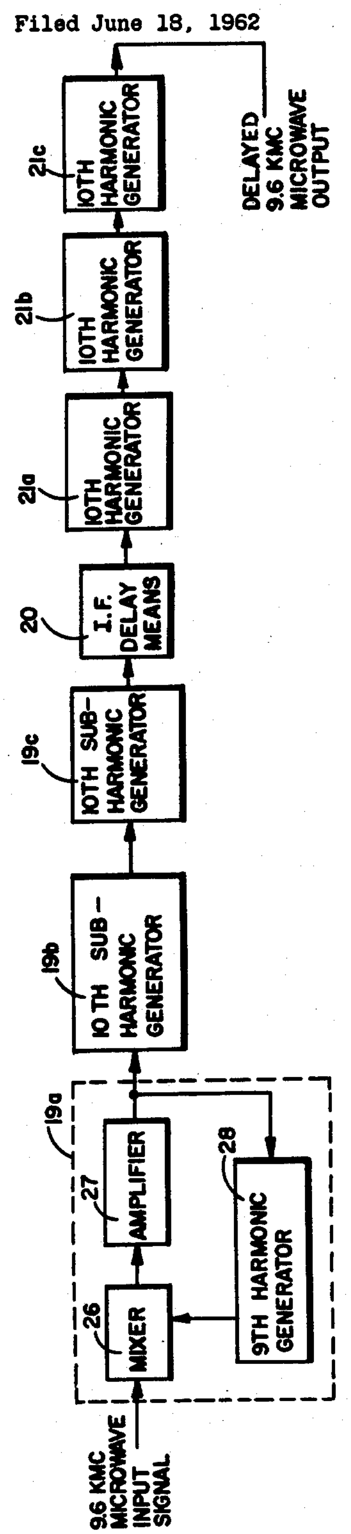
FIG. 3 shows the concept of the invention achieved through use of a tandem arrangement of subharmonic generators.

Whenever desirable, the subharmonic generator combination and the harmonic generator of FIG. 2 may be replaced with a plurality of such subharmonic generators in tandem, and a like number of harmonic generators in tandem, whereby signals of any microwave frequency may employ accurate IF frequency time delay means, as illustrated in FIG. 3.

Referring to FIG. 3, there is illustrated a tandem arrangement of microwave subharmonic generators and harmonic generators in cooperation with an IF delay element. There are provided three subharmonic generators 18*a*, 18*b* and 18*c* in tandem arrangement, each successively generating a tenth subharmonic of its microwave input signal, whereby a frequency division of 1000:1 is achieved. In this way, a microwave input signal of 9.6 kilomegacycles may be reduced to an IF frequency of 9.6 megacycles, which falls within the 20 megacycle upper limit of commercially available calibrated time delay means 20. Each subharmonic generator is similarly constructed and arranged, having a mixer such as mixer 26, amplifier such as amplifier 27 and a harmonic generator, such as generator 28 for generating a ninth harmonic output of an input thereto.

The input of an IF delay means 20 is responsively connected to the output of the last one, 19*c*, of the tandem connected subharmonic generators 19*a*, 19*b* and 19*c* while the output of delay means 20 is fed to a first one 21*a* of three harmonic generators 21*a*, 21*b* and 21*c* connected in tandem. Each harmonic generator is similarly constructed and arranged for providing a tenth harmonic output of an input thereto, whereby a frequency multiplication of 1000:1 is achieved.

Hence, it is to be appreciated that the device of the invention provides means for effecting a time delay in a microwave signal without resorting to the use of microwave delay lines.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, in a radar system comprising an antenna, a transmit-receive switch, a receiver, and a transmitter operatively interconnected: a first and second microwave coupling means between said transmit-receive switch and said antenna; a microwave delay system; said first microwave coupling means providing microwave energy from said transmitter to said antenna and said microwave delay system; said microwave delay system comprising a mixer, an amplifier, negative feedback means for generating a harmonic signal of the output of said amplifier and feeding said harmonic signal to the input of said amplifier, radio frequency delay means responsively connected to said amplifier, a harmonic generator responsively connected to said amplifier and providing a delayed microwave output; and said second microwave coupling means responsively connected to receive said delayed microwave output and transmit it to said receiver.

2. A microwave signal delay device comprising: an amplifier for amplifying a signal of radio frequency; a first harmonic generator responsively connected to the output of said amplifier; a radio frequency mixer responsively connected to the output of said first harmonic generator, and adapted to be connected to a microwave signal source; said amplifier being responsively connected to the output of said mixer; a radio frequency delay element responsively connected to the output of said amplifier for providing a time delay to radio frequency signals; and a harmonic generator responsively connected to the output of said time delay element and providing an output signal having a microwave frequency equal to that of the microwave signal source.

3. The device of claim 2 in which said first harmonic generator provides a lower harmonic than said second harmonic generator.

4. The device of claim 2 in which said first harmonic generator provides a lower harmonic than said second harmonic generator and the ratio of frequency provided by said first to second harmonic generator is $$\frac{n}{n+1}$$

where $n$ is an integer.

5. A microwave signal delay device comprising: an amplifier for amplifying a signal having a radio frequency, $f_i-nf_o$, where $n$ is an integer and $f_i$ is a microwave input frequency, and said amplifier providing at its output a frequency of $f_o$; a first harmonic generator responsively connected to the output of said amplifier for providing a signal having a frequency ($n$) times that of the output of said amplifier; a radio frequency mixer responsively connected to the output of said first harmonic generator, and adapted to be connected to a microwave signal source of microwave frequency $f_i$, said amplifier being responsively connected to the output of said mixer; a delay element responsively connected to the output of said amplifier for providing a time delay to radio frequency signals; and a harmonic generator responsively connected to the output of said time delay element providing an output signal having a microwave frequency equal to that of the microwave signal source.

6. The device of claim 5 in which the gain of said amplifier in decibels is set substantially equal to the combined signal loss in decibels through said mixer and said radio frequency delay means.

7. Testing means for a pulsed microwave radar system having an antenna used for transmitting and receiving, comprising: switch means for switching to provide said antenna with signals from the transmitter of said radar and for switching to provide the receiver of said radar with signals returned to said radar, a first and second microwave directional coupler interposed between said antenna and said switch means; and a time-delay generator responsively connected to said first coupler and having an output thereof connected to said second coupler, whereby a simulated target range signal of predetermined time delay is fed from said second coupler to said switch means in response to transmitter signals fed from said switch means to said antenna and said couplers.

8. Operational range time testing means for a pulsed microwave radar system having an antenna and a transmit-receive duplexer, comprising: a first and second microwave directional coupler interposed between said antenna and said duplexer, each coupler providing bi-directional microwave communication between said antenna and said duplexer; each coupler further having a third port for providing bi-directional microwave communication between said secondary guide and said duplexer and substantially attenuating microwave communication between said antenna and said secondary guide section; and a time delay generator responsively connected to the secondary guide section of one of said directional couplers for providing an output indicative of a microwave signal transmission from said duplexer to said antenna and delayed in time relative thereto by a predetermined amount; said secondary section of the other of said couplers being responsive to the output of said delay generator.

9. The device of claim 8 in which said time delay generator is comprised of: closed loop harmonic generator means for generating an RF subharmonic of a microwave signal, ultrasonic time delay means responsively connected to said closed loop means for providing a time delay to said RF output from said closed loop means, and second harmonic generator means responsively connected to said RF delay means for restoring said microwave characteristic to said delay signal.

10. The device of claim 9 in which the output of said closed loop means is fed back to the input of said closed loop means by a harmonic generator for generating a higher harmonic of the output of said closed loop means.

References Cited by the Examiner

UNITED STATES PATENTS

| | | | |
|---|---|---|---|
| 2,406,932 | 9/46 | Tunick | 331—76 |
| 2,831,116 | 4/58 | Hahnel | 331—76 |
| 2,994,829 | 8/61 | Hopper | 333—30 |

CHESTER L. JUSTUS, *Primary Examiner.*

KATHLEEN CLAFFY, *Examiner.*